Jan. 30, 1923.
P. J. HUHN.
PISTON AND PACKING.
FILED DEC. 17, 1919.
1,443,473.
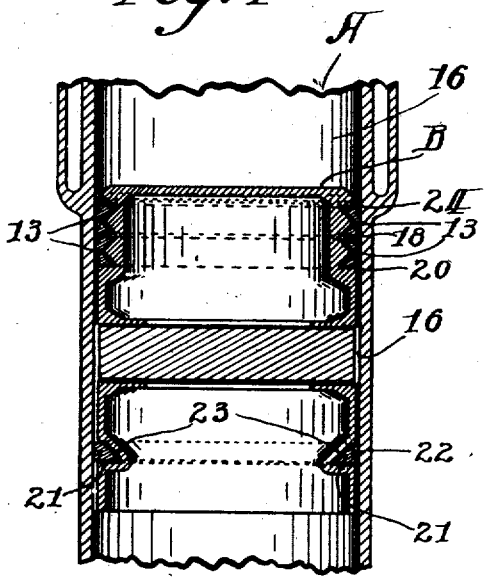
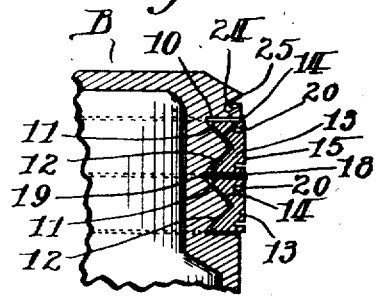
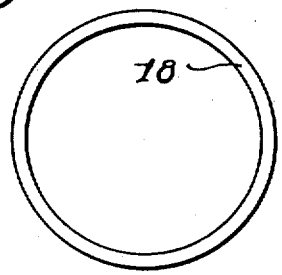
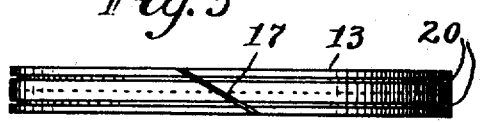
Inventor:
Paul J. Huhn
by: Howard Pinch
Atty.

Patented Jan. 30, 1923.

1,443,473

UNITED STATES PATENT OFFICE.

PAUL J. HUHN, OF ST. PAUL, MINNESOTA.

PISTON AND PACKING.

Application filed December 17, 1919. Serial No. 345,495.

*To all whom it may concern:*

Be it known that I, PAUL J. HUHN, a citizen of the United States, residing at St. Paul, in the county of Ramsey and State of Minnesota, have invented a new and useful Improvement in Pistons and Packing, of which the following is a specification.

My invention relates to pistons and packing and consists of peculiar features which are particularly adapted to overcome the loss of compression in a cylinder during the reciprocation of the piston. The packing rings of my invention work in conjunction with the peculiar form and shape of the piston to accomplish the desired results.

The invention further provides means for protecting the packing from carbon deposits when the piston and packing are used in internal combustion engines.

A feature of the invention is to provide a piston of such shape as to cause the packing rings to be forced into engagement with the cylinder wall to form a tight joint in either direction of reciprocation of the piston in the cylinder and to further provide packing means between the piston packing rings to form a pressure tight joint between the split packing rings. Heretofore a great deal of trouble has been experienced in forming a tight joint between split packing rings and various constructions have been designed to overcome leaky joints in the same. My invention overcomes this difficulty by providing suitable means between the packing rings.

The construction of my piston causes the piston rings to uniformly engage the wall of the cylinder in which they are operating at all points so as to avoid uneven wear on the cylinder wall.

In the drawings forming part of this specification:

Figure 1 is a cross sectional side elevation of a portion of a cylinder and of my piston and packing.

Figure 2 is a cross section of a detail portion of my piston and packing.

Figure 3 is a side view of one of my packing rings.

Figure 4 is a side view of another of my packing rings.

Figure 5 is a plan view of one of the gasket packing rings.

The drawings illustrate a portion of a cylinder A of an internal combustion engine in which my piston B reciprocates in the ordinary manner.

The piston B is formed of any suitable material and is provided with an annular recess 10 formed with inner annular serrations having sloping sides 11 and 12.

Packing rings 13 are adapted to fit in the recess 10 adjacent each other and are formed with V shaped annular grooves similar to and adapted to fit the serrations formed in the recess 10. The grooves 14 in the packing rings 13 fit the sloping sides 11 and 12 of the serrations of the recess 10 freely so that when the piston B is reciprocated in one direction the sides 12 will engage one side of the grooves 14 to force the outer surface 15 of the packing rings against the wall 16 of the cylinder to evenly and annularly engage the same to form a tight joint. While when the piston B is reciprocated in the opposite direction the sides 11 of the serrations will engage the opposite side of the grooves 14 of the piston rings 13 to cause the rings to be forced into engagement with the cylinder wall 16 and thus form a tight, annular joint during the reciprocation of the cylinder in this direction. In this manner the reciprocation of the piston B in either direction causes the rings to be forced evenly into engagement with the cylinder wall 16.

The piston rings 13 are split diagonally at 17 in the ordinary manner to allow them to be easily inserted in the recess 10, and to overcome any leak through the split 17 of the rings 13, I provide a packing gasket in the form of an undivided annular ring 18, which is formed of softer material or metal than the packing rings 13 and of a thin, flat nature so that it can be inserted or placed between the rings 13. In placing the ring 18 between the packing rings 13, one of the rings 13 is first placed in the recess 10 with its groove 14 engaging the sides 11 and 12 of the innermost serration. The packing ring or rings 18 are then slipped over the piston head adjacent the piston ring 13 and then the other packing ring 13 is slid over the piston head and into engagement with the sides of the other serration in the recess 10 so as to position the gasket packing rings between the pair of packing rings 13, it being obvious that a suitable number of rings can be used to give the desired packing effect between the pair of packing rings 13. It is essential that the rings 18 be of a soft nature so that they can be easily bent edgewise at one portion while they are slipped in place between the packing rings and again will assume their natural shape when the second packing ring is placed in the recess 10, and also for the reason that when the piston is reciprocated the packing rings 13 will compress the gasket or gaskets 18 and hold them into close engagement with the cylinder wall 16 and also prevent any leak through the split 17 of the packing rings 13, the soft nature of the gaskets 18 preventing them from scoring the wall 16 of the cylinder.

The rings 18 are formed with a larger inner diameter than the point 19 of the recess 10 to allow them free play between the rings 13, while the rings 13 are also larger at their inner diameter than the deepest point of the recess 10 so as to allow the rings to play freely enough to be engaged by the sides 11 and 12. The surfaces 11 and 12 of the serrations can be ground so as to fit the inner surfaces of the grooves 14 in the packing rings 13 to give as close a fit as may be most desirable between the packing rings and piston and to cause the rings to properly engage the cylinder wall to form a tight joint. The wedge shapes of the sides 11 and 12 gives a good support for the packing rings 13.

Each of the packing rings are formed with annular recesses 20 on their outer surfaces 15, which forms a suitable oil groove and also is adapted to collect any grit or other substances which might score the cylinder wall 16.

Near the lower portion of the piston B is provided an annular recess 21, which carries a packing ring 22, the cross sectional shape of which is similar to a half cross sectional portion of the piston packings 13. The recess 21 is formed with an angular side 23, which engages a similar angular surface on the packing 22 to cause the packing ring 22 to be forced into engagement with the wall 16 when the piston B is reciprocated in one direction, while when the piston B travels in the opposite direction the packing ring 22 is inclined to allow oil to follow the ring so as to properly lubricate the wall 16 of the cylinder. In this manner the packing ring 22 works only in one direction to transmit pressure from the piston B by the inclined side 23 to the ring to keep oil down or in one end of the cylinder so an excessive amount of oil will not work up to the pair of rings 13. The inclined side 23 acts to perform the same function as one of the sides 11 or 12.

An inwardly extending, angular groove 24 is formed annularly about the upper end of the piston B, which is above the pair of packing rings 13 and is for the purpose of collecting any carbon deposit which is inclined to work beyond the upper annular edge 25 of the piston B to prevent the carbon from working down to the pair of rings 13. The recess 24 will to a very large extent collect and prevent carbon deposit from working past the same to the piston packings 13 and thus is a material advantage in the construction of my piston to allow the packings 13 to properly operate.

The simple inexpensive construction of my piston and packing, together with the novel packing means between the packing rings, provides a piston and packing without complicated mechanism and which is adapted to form a pressure tight joint between the cylinder wall and the piston. It is obvious that any packing, to be practical for a piston of an internal combustion engine or any other cylinder where a tight joint is required between a piston and a cylinder wall, must be simple in construction and inexpensive to manufacture to make them practical for use. My invention accomplishes all of these features in a very effective manner. My piston and packing are adapted to be used in any cylinder where a tight joint is required.

The wedge shape of the serrations in the recess 10 tend to form a cam action against the packing rings 13 to evenly expand the same annularly against the cylinder wall 16 in either direction of reciprocation of the piston B. This feature is of primary importance in my invention.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. A piston and packing for a cylinder including a packing ring formed with a V-shaped annular groove extending around the interior of the same, an annular recess formed in said piston and a V-shaped ridge formed integral with said piston within the recess, adapted to engage the groove of said ring to force said ring into close engagement with the cylinder wall in either direction of reciprocation of said piston.

2. A piston and packing for a cylinder including a packing ring formed with an outwardly extending pair of inclined walls, an annular recess formed in said piston and a double inverted conical ridge formed integral with said piston within the recess, adapted to engage the groove of said ring to force said ring into close engagement with the cylinder wall in either direction of reciprocation of said piston.

3. A piston and packing for a cylinder, including split packing rings, means in said piston for forcing said packing rings towards each other in the reciprocation of said piston in either direction, said rings having oppositely facing plane surfaces, a flat packing gasket interposed between the surfaces of said packing rings and adapted to be compressed between said packing rings to form a pressure tight joint when said piston is reciprocated in a cylinder.

4. A piston and packing for a cylinder including split packing rings, means in said piston for forcing said packing rings towards each other in the reciprocation of said piston in either direction including a V shaped groove formed on the inner side of said rings and corresponding V shaped ridges formed on the piston for engaging said grooves, and a packing gasket interposed between said packing rings and adapted to be compressed between said packing rings to form a pressure tight joint when said piston is reciprocated in a cylinder.

5. A piston including a recess having wedge shaped surfaces, a packing ring adapted to envelope said wedge shaped surfaces and to be forced by the said surfaces into close engagement with the cylinder wall in the reciprocation in either direction of said piston to form a pressure tight joint.

6. A piston and packing for a cylinder, including split packing rings, means in said piston for forcing said packing rings toward each other in the reciprocation of said piston in either direction and a packing gasket interposed between said packing rings and adapted to be compressed between said packing rings to form a pressure tight joint when said piston is reciprocated in a cylinder.

7. A piston and packing, including an annular recess formed in said piston, annular serrations formed in said recess, packing rings and grooves formed in said packing rings adapted to be engaged by said serrations to cause the pressure exerted against said piston to be transmitted to one side of the grooves formed in said packing rings when the piston is reciprocated in one direction and to transmit the force from the piston to the other side of the groove formed in said packing rings when the piston is reciprocated in the opposite direction, whereby a pressure tight joint is formed between said piston and a cylinder wall in which said piston is adapted to be reciprocated.

8. A piston and packing, including an annular serrated recess formed in said piston and packing rings having grooves formed therein which are adapted to engage the serrations of said recess freely to cause pressure to be directed at an angle in the direction of movement of said piston to force the piston rings outward into engagement with the cylinder wall in which the piston and packing is being reciprocated.

9. A piston and packing, including a pair of packing rings positioned adjacent each other, a packing gasket adapted to be compressed between said packing rings to form a pressure tight joint between said packing rings and about said piston, a packing ring positioned near the opposite end of said piston and means in said piston adapted to expand said last mentioned packing ring against the wall of a cylinder in which said piston is adapted to reciprocate in one direction of travel of said piston.

10. A piston and packing, including packing rings positioned adjacent each other, packing gaskets between said rings and means formed in said piston adapted to cause said packing rings to press said gaskets tightly between said packing rings to form a pressure tight joint in a cylinder.

PAUL J. HUHN.